United States Patent [19]

Schultz et al.

[11] 3,947,683

[45] *Mar. 30, 1976

[54] COMBINATION OF EPITHERMAL AND INELASTIC NEUTRON SCATTERING METHODS TO LOCATE COAL AND OIL SHALE ZONES

[75] Inventors: Ward Edward Schultz; Harry Davis Smith, Jr.; Philip France McKinlay, all of Houston, Tex.

[73] Assignee: Texaco Inc., New York, N.Y.

[*] Notice: The portion of the term of this patent subsequent to Nov. 19, 1991, has been disclaimed.

[22] Filed: Feb. 15, 1974

[21] Appl. No.: 442,932

Related U.S. Application Data

[63] Continuation-in-part of Ser. No. 367,299, June 5, 1973, Pat. No. 3,849,646.

[52] U.S. Cl. .............................. 250/270; 250/269
[51] Int. Cl.² .......................................... G01T 5/00
[58] Field of Search ........................... 250/269, 270

[56] References Cited
UNITED STATES PATENTS 3,184,598  5/1965  Tittle ................................ 250/270
3,849,646  11/1974  McKinlay et al. ................. 250/270

Primary Examiner—Archie R. Borchelt
Attorney, Agent, or Firm—T. H. Whaley; C. G. Ries; William J. Beard

[57] ABSTRACT

A pulsed source of high energy neutrons is used to irradiate the earth formations in the vicinity of a well borehole. Gamma rays produced by the inelastic scattering of the fast neutrons are observed in four energy regions of the gamma ray energy spectrum corresponding to the inelastic scattering of neutrons by carbon, oxygen, silicon and calcium. Signals representative of the carbon/oxygen, calcium/silicon and carbon plus oxygen gamma rays observed are developed. By appropriately combining these signals with a separately derived hydrogen index log the quality of coal bearing formations or oil shale regions penetrated by the borehole may be determined.

10 Claims, 5 Drawing Figures

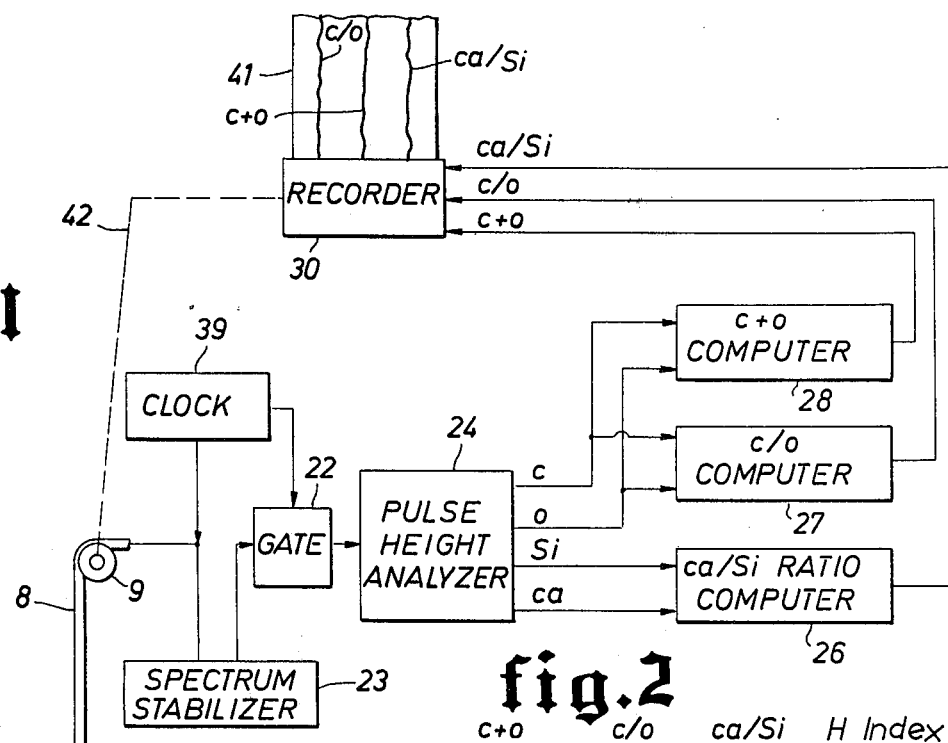
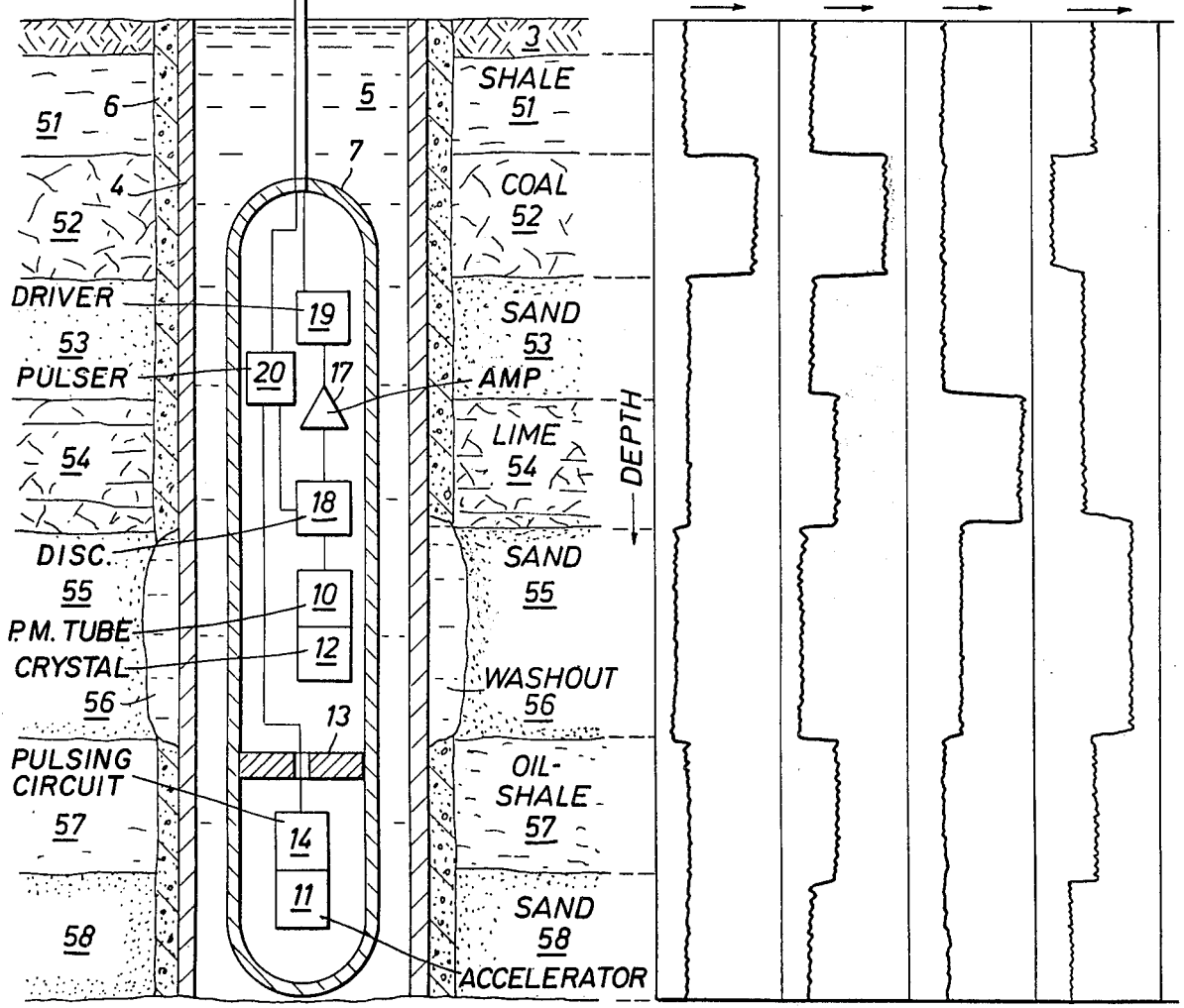

3,947,683

COMBINATION OF EPITHERMAL AND INELASTIC NEUTRON SCATTERING METHODS TO LOCATE COAL AND OIL SHALE ZONES

This application is a continuation-in-part of copending application Ser. No. 367,299, filed June 5, 1973, now U.S. Pat. No. 3,849,646 and assigned to the assignee of the present invention.

BACKGROUND OF THE INVENTION

This invention relates to radiological well logging methods and apparatus for investigating the characteristics of subsurface earth formations traversed by a borehole and more particularly relates to improved pulsed neutron well logging techniques for differentiating and determining the quality of coal and oil shale regions in subsurface earth formations traversed by a well borehole.

It has been proposed in the prior art to make a measurement of at least a portion of the gamma ray energy spectrum due to inelastic neutron scattering events from neutron irradiated earth formations. This has been proposed because carbon and oxygen have significant inelastic scattering cross-sections while having a relatively small capture cross-section for high energy neutrons. Thus, the carbon and oxygen nuclei in formations surrounding a borehole will engage in appreciable inelastic scattering interactions with the bombarding high energy neutrons. Gamma rays resulting from the inelastic neutron scattering interaction (henceforth referred to as inelastic gamma rays) may then be detected as a direct hydrocarbon indicator. However, this approach has been limited in the past to some extent because the inelastic scattering cross-section of carbon and oxygen only became appreciable if relatively high energy neutrons are available to provide the inelastic scattering interaction. In the past it has been difficult to provide sufficient quantities of energetic neutrons to reliably perform this type of well log. The development of improved pulsed neutron generators has made possible the measurement of the inelastic scattering gamma ray energy spectrum from relatively high energy neutron irradiated earth formations. It is now possible to measure the carbon and oxygen inelastic scattering interactions with 14 MEV neutrons generated in pulsed neutron generators of the deuterium-tritium reaction type.

A difficulty encountered in this type of direct hydrocarbon logging has been due to the fact that carbon is present in significant amounts in the earth's crust in other than hydrocarbon bearing formations. For example, limestone formations are largely composed of calcium carbonate and thus a water bearing limestone formation can produce more inelastic carbon gamma rays than an oil filled shale or sand. The carbon/oxygen ratio of inelastic gamma rays has also been found to be a function of porosity, and therefore a low porosity oil filled formation may produce less inelastic carbon gamma rays than a partially depleted higher porosity formation.

Another problem in making inelastic gamma ray measurements has been due to the fact that the gamma rays generated by the neutron inelastic scattering can suffer multiple Compton scattering. Such scattering generally tends to make the scattered gamma rays lose energy to some extent with each interaction. Thus, a gamma ray having an initial particular energy generated by the inelastic scattering of a neutron by a carbon or oxygen nucleus can have an apparently different energy by this time it reaches a detector in a well logging sonde. However, techniques such as those disclosed, for example, in U.S. Pat. No. 3,780,303 have been derived to generally alleviate the aforementioned problems. Using techniques of the type described in this aforementioned patent, it is possible to derive a hydrocarbon log of subsurface earth formations in the vicinity of a well borehole by observing the inelastic gamma rays due to the scattering of 14 MEV neutrons from a pulsed neutron source employing the deuterium-tritium reaction.

In the present invention the carbon/oxygen ratio of subsurface earth formations can be used to determine the quality or BTU content of any coal beds encountered by a well borehole in penetrating earth formations and also to determine the quality or gallons per ton of producable oil in an oil shale formation which is encountered by the well borehole. Means are provided for distinguishing shale and washed out regions of formations in the vicinity of a borehole and for distinguishing limestone and other high carbon content earth formation such as dolomite which may be associated with oil bearing shales or sands. By combining these measurements with a porosity or hydrogen index log the moisture content of the coal or oil shale zones may be estimated.

Accordingly, it is an object of the present invention to provide methods for determining the quality of coal bearing earth formations in the vicinity of a well borehole.

Another object of the present invention is to provide an improved technique for determining the quality of oil shale formations encountered by a well borehole.

The above and other objects of the present invention are accomplished by passing a well tool having a pulsed source of 14 MEV neutrons through a fluid filled cased or uncased well bore. Inelastic gamma ray measurements of neutrons produced from the pulsed neutron generator are observed in at least four different energy regions in the gamma ray energy spectrum corresponding to inelastic scattering gamma rays produced by carbon, oxygen, silicon and calcium. The carbon/oxygen count ratio of these inelastic gamma rays is formed. The calcium/silicon count ratio of the inelastic gamma rays is formed and the sum of the carbon plus oxygen inelastic gamma rays is formed. The above quantities may be recorded as a function of depth in the well borehole. Separately derived well logs indicative of the hydrogen index of the formations of interest may then be used in conjunction with the inelastic gamma ray scattering measurements in order to distinguish coal bearing and oil shale formations in the vicinity of the well borehole from other earth formations and to derive a quantitative estimate of the quality of the BTU content of the coal bearing formation and the amount of oil present in the oil shale formations.

The present invention may be best understood by taking the following detailed description thereof in conjunction with the appended drawings in which:

BRIEF DESCRIPTION OF THE DRAWINGS

FIG. 1 is a block diagram showing the well logging system of the present invention.

FIG. 2 is a schematic well log obtained by the system of the present invention when passed through the earth formations depicted in the schematically illustrated borehole of FIG. 1.

DESCRIPTION OF THE PREFERRED EMBODIMENTS

Figure 3:
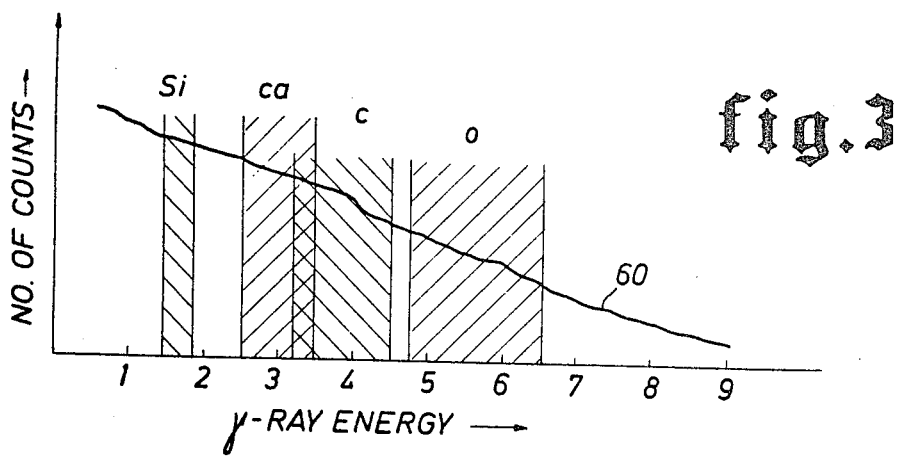
FIG. 3 is a gamma ray energy spectrum from inelastic neutrons scattering events and showing the placement of the energy windows utilized with the well logging system of the present invention.

Referring initially to FIG. 1 there may be seen a simplified functional representation in the form of a block diagram of well logging apparatus in accordance with the present invention. A borehole 2 penetrating earth formations 3 is lined with a steel casing 4 and filled with a well fluid 5. The steel casing 4 is cemented in place by a cement layer 6 which also serves to prevent fluid communication between adjacent producing formations in the earth 3. The invention may also be used in uncased boreholes if desired. In the drawing of FIG. 1 the earth formations 3 are shown subdivided into several different types of formations which will be discussed subsequently. A shale layer 51 overlies a coal layer 52 which is bounded on its bottom portion by a sand layer 53. Beneath the sand layer 53 is a limestone layer 54 and immediately beneath this a sand layer 55 having a water filled wash-out portion 56 immediately adjacent the steel casing 4. Located beneath the washed-out sand 55 is an oil shale formation 57 and beneath this formation is located a sandstone formation 58. The response of the well logging system of the present invention in these zones will be discussed in more detail subsequently.

The downhole portion of the logging system of FIG. 1 may be seen to be basically composed of an elongated fluid tight, hollow body member or sonde 7 which during the logging operation is passed longitudinally through the casing 4 in a conventional manner by a winch (not shown) and is sized for passage therethrough. Surface instrumentation whose function will be discussed in more detail subsequently is shown for processing and recording electrical measurements provided by the sonde 7. A well logging cable 8 which passes over a sheave wheel 9 supports the sonde 7 in the borehole 2 and also provides a communication path for electrical signals to and from the surface equipment and the sonde 7. The cable 8 may be of a conventional armored well logging type and may have one or more electrical conductors for transmitting such signals between the sonde 7 and the surface apparatus. Alternatively, the cable 8 may comprise an armored coaxial cable referred to by those skilled in the art as a tri-axial cable.

Still referring to FIG. 1, the sonde 7 contains a source of high energy neutrons 11. The neutron source contemplated for use herein is a pulsed neutron source operating from the principle of the deuteriumtritium reaction. However, it will be understood by those skilled in the art that the invention is not limited thereto. Other types of pulsed neutron sources may be used if desired.

A suitable radiation detector comprising a photomultiplier tube 10 and a detector crystal 12 is provided in the sonde 7 for detecting gamma rays resulting from the inelastic scattering of high energy neutrons by the earth formations 3 surrounding the well borehole 2. A radiation shield 13 of a neutron moderating material such as paraffin, carbon, iron, lead, or steel or suitably interposed layers of such is provided between the neutron accelerator 11 and the detector crystal 12 of the apparatus. Additionally, a thermal neutron shielding sleeve (not shown) of boron or other suitable thermal neutron absorbing material may be provided about the detector crystal portion of the sonde on either the interior or exterior wall portions thereof. Such a thermal neutron shield reduces the probability of thermal neutrons reaching the detector crystal and causing neutron activation of the materials comprising the crystal. The detector crystal itself 12 may comprise a thallium doped sodium or cesium iodide or other like activated material which is optically coupled to the photomultiplier 10.

The scintillation crystal 12 produces a discrete flash of light whenever a gamma ray passes therethrough and exchanges energy with its crystal lattice structure. The photomultiplier tube 10 generates a voltage pulse proportional in height to the intensity of each such scintillation which occurs in the crystal 12. The intensity of such scintillations is functionally related to the energy of the gamma rays causing the light flash. Thus, a voltage pulse generated by the photomultiplier tube has an amplitude functionally related to the energy of the corresponding gamma ray causing the scintillation. These proportional voltage pulses produced by the photomultiplier tube 10 comprise a detector signal which is supplied to a linear amplifier 17 via a discriminator 18. The discriminator 18 may be used if desired to discriminate, for example, against low energy background gamma radiation resulting from thermal neutron activation of the detector crystal by the $I_{127}$ (n,$\gamma$) $I_{128}$ reaction. A preset bias level may be used to pass only pulses from the photomultiplier tube exceeding the height corresponding to these gamma rays and including the pulses corresponding to 1.78 MEV gamma rays generated in the inelastic scattering of neutrons by silicon. However, the discriminator level may be set at a lower energy or eliminated altogether if desired.

The neutron accelerator 11 is preferably operated by a pulsing circuit 14 which may be of conventional design and which functions to operate the accelerator in short duration pulses. The pulsing circuit 14 may be controlled by timing pulses from a surface timing reference 39 communicated over the cable 8 conductors and supplied to a downhole reference pulser 20. For example, the pulsing circuit 14 could be activated by a timing pulse from the time reference 39 to emit a neutron burst of a specified time duration. The frequency of such bursts would then be controlled by the surface timing reference 39. Timing reference 39 could also be located in the downhole sonde if desired instead of at the surface as illustrated in FIG. 1.

In the inelastic scattering measurements contemplated in the present invention it may be desirable to use neutron pulses of as short a duration as possible. In this application neutron pulses of about 5 microseconds duration and which are repeated at repetitive intervals from approximately 5,000 to 20,000 times or more per second are utilized. At the beginning of a neutron pulse from the accelerator 11 there is a sudden and rapid buildup of the inelastic gamma ray population in the vicinity of the detector. This population is essentially present only during the neutron pulse. The thermal neutron capture gamma ray population builds up much more slowly and reaches a peak only after cessation of the five microsecond neutron pulse. Thus, by using an extremely short duration neutron pulse thermal background radiation is reduced to a minimum. Other background correction schemes such as those disclosed in the aforementioned copending patent application may also be used if desired.

During the time the neutron accelerator 11 is activated, output signals from the photomultiplier tube 10 are conducted via the discriminator 18 and linear amplifier 17 to a cable driver circuit 19 of conventional design. A reference signal having a known amplitude is also supplied by a pulser 20 to the input of the discriminator 18. This reference amplitude pulse provided by the downhole pulser 20 is utilized in a gain control device or spectrum stabilizer 23 to control the gain of the system. This function, of course, may be accomplished primarily between the neutron pulses as the spectrum stabilizer 23 may be supplied with signals from the pulser 20 continuously or in any desired sequence.

Since both the downhole pulse generator 14 and the surface gate 22 which controls the admittance of the data pulses from the downhole tool to the succeeding circuitry are operated from the same timing reference 39 it is apparent that synchronism may be maintained between the surface equipment and the downhole equipment. Thus, the data signals may be gated in a manner at the surface to select portions thereof for processing which are timed as desired relative to the emission of the neutron burst. In acquiring the inelastic gamma ray measurements of the present invention only those pulses produced by the photomultiplier 10 during the operative cycle of the accelerator 11 are passed by the gate 22 to the pulse height analyzer 24 for further evaluation.

Although not depicted in FIG. 1, it will be understood by those skilled in the art that electrical power may be supplied from a conventional type surface power source (not shown) via the well logging cable 8 to the downhole sonde 7. Suitable power supplies as well known in the art (not shown) are provided in the sonde 7 for powering the downhole portion of the equipment.

The output signals from the gate 22 comprise a sequence of count pulses resulting from gamma rays detected by the downhole detector crystal 12 during the time interval that the neutron accelerator 11 is activated. These pulses comprise data mainly from gamma rays resulting from the excitation of nuclei in the vicinity of the borehole which have been excited by the inelastic sactttering of the neutrons emitted by the accelerator 11.

The inelastic gamma rays are supplied to a pulse height analyzer 24. The pulse height analyzer 24 may be of conventional design as known in the art and having, for example, four or more channels or energy divisions corresponding to quantizations of the pulse height of the input pulses. The pulse height analyzer 24 functions to sort and accumulate a running total of the incoming pulses into a plurality of storage locations or channels based on the height of the incoming pulses. The height of these pulses, it will be recalled is directly related to the energy of the gamma rays causing the pulse. The output of the pulse height analyzer 24 in the case of the present invention consists of count pulses occurring in each of four energy windows as depicted in FIG. 3.

Referring now to FIG. 3, the relative count rate of inelastic gamma rays as a function of energy is shown as a solid curve 60. It will be observed that four energy windows corresponding to silicon (labelled Si), calcium (labelled Ca), carbon (labelled C), and oxygen (labelled O) are provided. In the practice of the method of the present invention it has been found preferable to use a carbon energy window extending from approximately 3.17 to approximately 4.65 MEV in the gamma ray energy spectrum. The oxygen energy window preferably extends from approximately 4.86 to approximately 6.34 MEV. The silicon energy window is chosen to extend from approximately 1.65 to approximately 1.86 MEV. The calcium energy window extends from approximately 2.50 to approximately 3.30 MEV.

By using this choice of energy windows, the 4.44 MEV carbon inelastic gamma ray scattering peak and the 6.13 MEV oxygen inelastic gamma ray energy scattering peak are covered. The corresponding single and double pair production escape peaks (which occur typically in a 2 inch diameter by 4 inch long sodium or cesium iodide crystal such as that used in the present invention) are also counted. The optimal choice of energy range for the silicon energy window encompasses the 1.78 MEV photopeak for silicon. The calcium energy window illustrated in FIG. 3 does not encompass the 3.73 MEV calcium photopeak due to carbon interference. This window, however, does encompass the corresponding single and double pair production escape peaks. It will be understood, of course, by those skilled in the art that slight variations of this placement of energy windows could be made, if desired, without seriously compromising the inventive concepts.

The number of counts occurring in each of the four energy windows above described during the time interval that the downhole detector signals are supplied to the pulse height analyzer 24 via the gate 22 are output from the pulse height analyzer 24 as four separate digital signals labelled C, O, Si, Ca as illustrated in FIG. 1. It will be understood, of course, that the individual time interval pulse counts may be integrated over a longer period of time for better statistical accuracy as known in the art. The carbon and oxygen count rates are supplied to the carbon/oxygen ratio computer 27 and to the carbon plus oxygen sum computer 28. The silicon and calcium count rates are supplied to the calcium/silicon ratio computer 26. The ratio computers 26 and 27 may be of conventional design as known in the art. Similarly, the carbon plus oxygen sum computer 28 may be of conventional design as known in the art.

Output signals from the three computers 26, 27 and 28 are supplied to a recorder 30. These signals can be recorded as a function of borehole depth by the recorder 30 which is mechanically or electronically linked to the sheave wheel 9 as indicated by the dotted line 42. A well log 41 of these quantities as a function of the borehole depth may then be produced as illustrated schematically in FIG. 1.

It may be shown that the depth of investigation, a measure of the relative amount of formation signal, increases gradually with an increase in neutron source to detector spacing. However, the number of inelastic gamma rays reaching the detector decreases rapidly with increased spacing. For the detector illustrated in FIG. 1 with the deuterium-tritium accelerator yielding approximately $10^8$ neutrons per second and operating at 5,000 pulses of neutrons per second it has been determined that a detector spacing less than 24 inches causes too rapid a counting rate for the band width of the cable 8 during the period that the inelastic gamma ray gate 22 is open. This can lead to a loss of energy resolution in the spectrum of the gamma rays being measured due to the phenomenon of pulse pile-up or interference on the cable conductor. At source to detector spacing greater than approximately 24 inches, at 5,000 neutron pulses per second, the number of inelastic gamma rays reaching the detector has been found to diminish in an unfavorable manner. For this reason it has been found desirable to use a neutron source to detector spacing of approximately 24 inches in order to achieve optimum counting results when the instrument is operated at approximately 5,000 pulses per second. Of course, this distance could be changed if improved generators, detectors, or signal transmission systems are made available, or if unusual borehold conditions are encountered. If higher repetition rates are used for the neutron generator with a smaller number of neutrons per burst, then a spacing of approximately 22 inches has been found satisfactory while avoiding the pulse pile-up.

Figure 4:
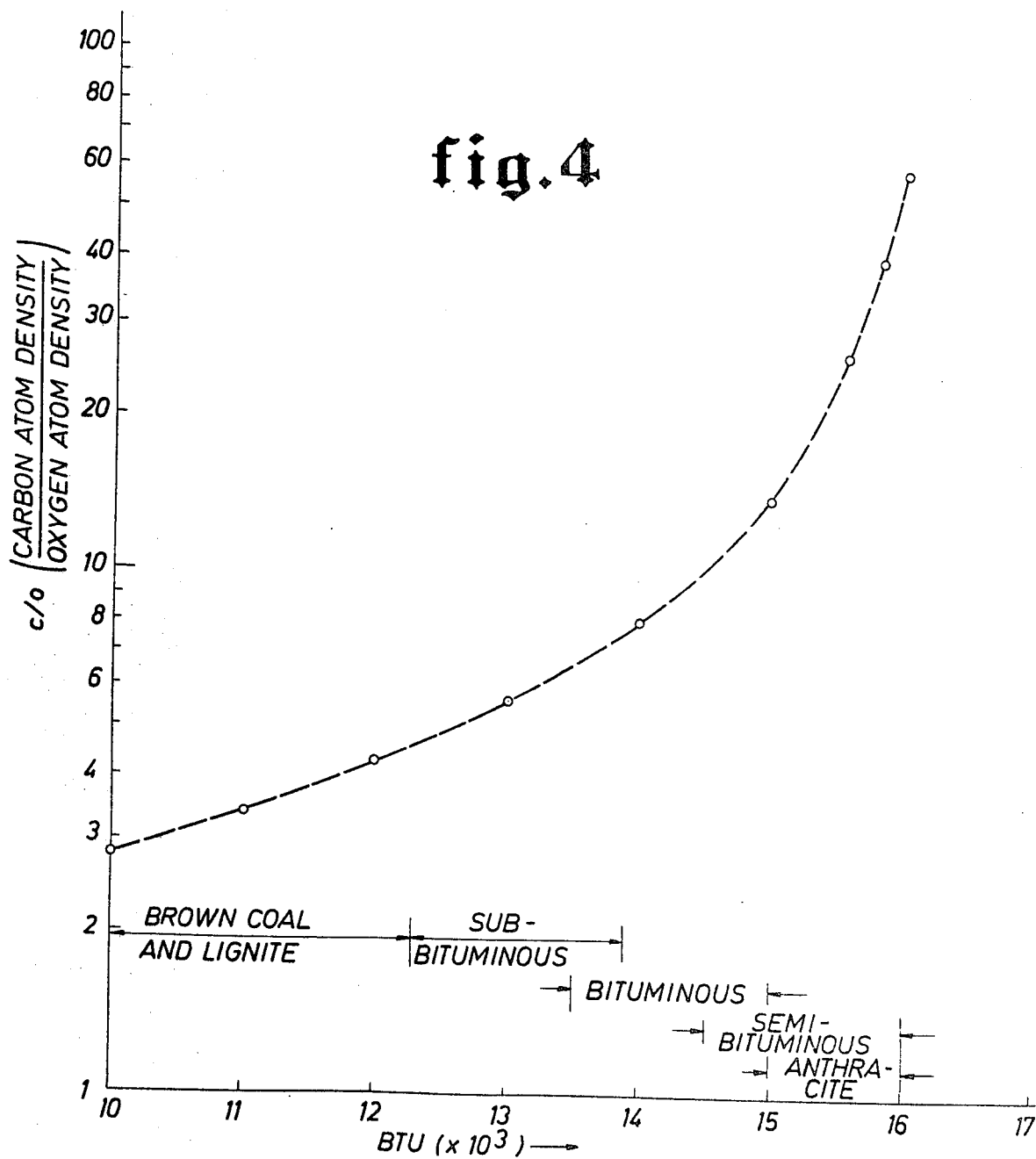
FIG. 4 is a graphical illustration giving the BTU content, or quality, of coal as a function of the carbon/oxygen ratio as determined from actual elemental compositions.

Referring now to FIG. 4, a graphical representation illustrating the BTU content or quality of coal vs. the carbon/oxygen ratio as determined from the actual elemental compositions for different coal grades. The higher grades of coal such as anthracite contain less moisture, and hence less oxygen, than lower grades of coal such as the brown coal and lignite, which are found in the low carbon/oxygen ratio region of the graph of FIG. 4. The high grade anthracite, semi-hard bituminous, and bituminous coals are more nearly pure carbon with less moisture content, and can be seen in FIG. 4 to have higher carbon/oxygen ratios. Coal zones encountered by a well borehole may thus be distinguished as to their quality or BTU content on the basis of the carbon/oxygen ratio as determined by the well logging system of FIG. 1.

Figure 5:
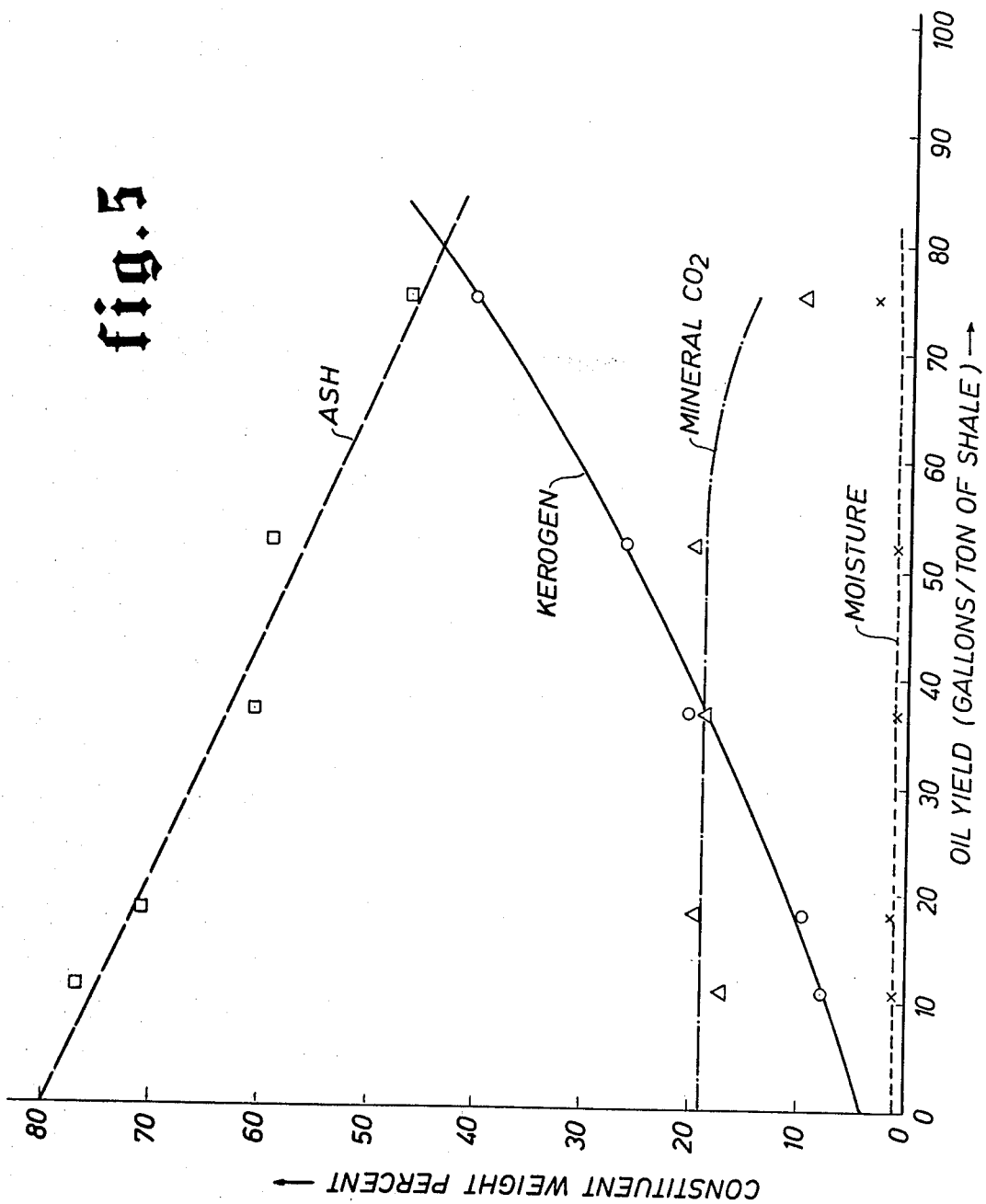
FIG. 5 is a graphical illustration showing the oil yield of typical oil shales as a function of the constituent weight percent of various materials comprising these shales.

Referring now to FIG. 5, the quality of oil shale which is usually indicated in gallons per ton of producible oil varies with changes in the relative abundance of the basic constitutents of this shale. The primary constitutents of oil shales may be categorized as:

1. Kerogen — the organic material in the shale from which the oil is produced.
2. Ash — the mineral content of the processed shale including $SiO_2$, $CaO$, $Fe_2O_3$, $Al_2O_3$, and others.
3. Mineral $CO_2$, and
4. Moisture Content The carbon/oxygen ratio for ash, mineral $CO_2$, and water are all in the range between 0.0 and 0.5. The carbon/oxygen ratio for kerogen based on analysis of a large number of oil shale samples is calculated to be between 15 and 25. Therefore, variations in the carbon/oxygen ratio as determined by a well logging system such as that of FIG. 1 will be primarily controlled by variations in the kerogen content of the shale. This kerogen content is directly related to the oil yield or potential from the shale as seen in FIG. 5, and thus the carbon/oxygen ratio as determined by the system of FIG. 1 in an oil shale is a direct indicator of the shale quality.

Oil shales are also usually found to be dolomitic in nature. The calcium/silicon ratio as determined by the well logging tool of FIG. 1 can assist in indentifying the dolomitic regions and thus prove valuable in identifying the dolomitic regions and thus prove valuable in identifying the oil shale regions encountered by a well borehole.

The carbon/oxygen ratio evaluation of oil shales is virtually independent of the presence of the mineral nahcolite ($NaHCO_3$), since nahcolite has a carbon/oxygen ratio approximately equal to 0.33, very low relative to kerogen. Nahcolite can appear as a rich oil shale on a conventional gamma ray density log since both kerogen and nahcolite have relatively low densities. However, the carbon/oxygen ratio of nahcolite in the shale should not effect the well log obtained with the system of FIG. 1 significantly. Thus, zones which could be interpreted as nahcolite containing by the well logging system of FIG. 1 could easily be mistaken as a rich oil shale using a conventional gamma ray density log by itself.

The graphical well log representations of FIG. 2 include two moisture indicating logs which may be of assistance in evaluating the quality of the coal or oil shale encountered. These are the carbon plus oxygen inelastic gamma ray count rate signal and the signal labeled H index or hydrogen index. The carbon plus oxygen inelastic gamma ray signal is a moisture indicator (or porosity indicator) since hydrogen is an efficient fast neutron moderator which can interact with the 14 MEV source neutrons to lower their effective energy. On the average a neutron undergoing an elastic scattering reaction with a hydrogen nucleus (proton) will lose ½ of its initial energy before the scattering reaction. As substantial neutron energy (approximately 6 MEV) is required for a neutron to engage in an inelastic scattering reaction with oxygen (and slightly less with carbon) then a decreased carbon plus oxygen count rate in a coal or oil shale zone is an indicator of low moisture content and hence a higher quality zone.

However, a more statistically accurate measurement of the hydrogen index is desirable for this evaluation and is provided by the H Index curve of FIG. 2. This measurement is preferably made by the dual spaced detector epithermal neutron porosity logging techniques disclosed in copending U.S. patent application Ser. No. 289,901 filed Sept. 18, 1972 and assigned to the assignee of the present invention. This Hydrogen Index measurement suffers less from borehole fluid salinity effects than other presently available techniques. However, other techniques such as conventional thermal neutron-gamma ray logs can be used in evaluating the coal or oil shale zones (i.e., used to provide the H Index curve of FIG. 2), if desired.

Referring now to FIG. 2, the performance of the well logging system of FIG. 1 in the schematic earth formations of FIG. 1 is illustrated. In the shale region 51 the carbon plus oxygen signal, the carbon/oxygen ratio, and the calcium/silicon ratio all remain at a low value. In the coal region 52, however, the carbon plus oxygen signal, the carbon/oxygen ratio signal and the gamma ray density curve all take on relatively high values. The H Index curve is shown to decrease in the coal region 52 because for this example the amount of hydrogen was assumed to be less in the coal than in the other regions. The calcium/silicon ratio remaining at a low value in this region, indicates that this is not a limestone region which could erroneously be interpreted as a hydrocarbon region due to its carbon content, and thus provides a means for distinguishing the true coal bed 52 from the water filled limestone situation.

In the clean sand zone 53 the carbon/oxygen ratio and calcium/silicon ratios remain low together with the carbon plus oxygen signal recorded by the system of FIG. 1. The H Index curve remains at an intermediate level in this region. In the limestone zone 54 the carbon/oxygen ratio assumes an intermediate value while the calcium/silicon ratio assumes a relatively high value. The carbon plus oxygen inelastic gamma ray signal remains at a low value and the H Index curve also indicates a relatively low value in the water filled limestone regions. The simultaneous increase in both carbon/oxygen and calcium/silicon ratio curves without a corresponding increase in the carbon plus oxygen or the H Index signal thus enables this zone to be distinguished as a limestone. The water filled sand region 55 has a wash-out region 56 immediately adjacent to steel casing 4 of the borehole and this washout region is assumed to be filled with water in FIG. 1. The carbon plus oxygen signal in this region drops to a low value as does the carbon/oxygen ratio signal. This is because of the neutron thermalizing effects of the water in the washed out region 56. The H Index log, on the other hand, indicates an erroneously high reading in this area due to the hydrogen content of the water filling the washed out region 56. Without the assistance of the other curves the H Index log could be interpreted as indicating a hydrocarbon bearing formation. In this region the calcium/silicon ratio log assumes an intermediate value which enables the region lithology to be identified as sand rather than lime.

In the oil shale zone 57 the carbon/oxygen ratio assumes an intermediate to high value and the H Index log indicates an intermediate value. In this region, however, the carbon plus oxygen signal remains at a relatively low value enabling this region to be distinguished as an oil shale rather than a coal bearing region such as region 52 previously discussed. Finally, in the clean sand zone 58 all four curves return to their intermediate or base line values indicating a sand region. It should be noted that, as is well known in the art, the natural gamma ray, spontaneous potential, or other logs can be used to assist in the delineation of shale and coal beds.

The carbon plus oxygen signal illustrated in FIGS. 1 and 2 is a porosity indicator which is derived from the fast neutron inelastic scattering by summing the counts occurring in these energy regions as depcited in FIG. 3. A low number of counts in this region indicates a high hydrogen content which implies a high porosity earth formation in the vicinity of the well borehole. The response of the H Index curve is similar. When using the well logging system of FIG. 1 in conjunction with a Hydrogen Index well logging tool log as illustrated in FIG. 2, the fluid content and hydrocarbon content of the formations may be evaluated by observing the relative performance of the four curves as illustrated in FIG. 2, with the possible addition of gamma ray, SP, and any other logs if available. The calcium/silicon ratio enables limestone regions to be differentiated from regions which might otherwise be indicated as having a high hydrocarbon content from the carbon/oxygen ratio alone. Once the lithology of the region is determined by the comparison of the four curves illustrated in FIG. 2 a quantitative estimate of the BTU content of the coal in coal bearing formations may be determined by means of comparing with measured carbon/oxygen values in known formations. Thus, using the techniques described, the lithological characteristics of earth formations in the vicinity of a well borehole may be determined, the BTU content or quality of any coal beds encountered by the borehole may be determined, and the location of oil shale zones penetrated by the borehole may be obtained.

The above description may make other alternative arrangements apparent to those skilled in the art. It is therefore the aim of the appended claims to cover all such changes and modifications as fall within the true spirit and scope of the invention.

We claim:

1. A method for locating and determining the quality of coal beds traversed by a well borehole comprising the steps of:

passing a well tool having a pulsed source of fast neutrons and radiation detector through a well bore;

repetitively irradiating the earth formations in the vicinity of the well bore with relatively short duration bursts of fast neutrons;

detecting, during said neutron bursts, gamma rays resulting from the inelastic scattering of fast neutrons by carbon and oxygen, in earth formations in the vicinity of the well bore and generating signals representative thereof;

generating signal representative of the carbon/oxygen ratio of inelastic gamma rays in earth formations in the vicinity of the well bore;

determining the location and the quality of said coal beds by comparing said carbon/oxygen ratio signal with a predetermined relationship of said carbon/oxygen ratio signal as a function of the BTU content of coal.

2. The method of claim 1 and further including the steps of generating a second signal representative of the calcium/silicon ratio of inelastic gamma rays in earth formations in the vicinity of the well borehole and using said first and second signals to locate coal beds.

3. The method of claim 2 wherein the step of detecting the inelastic gamma rays from carbon, oxygen, silicon and calcium is performed by detecting, during said neutron bursts, gamma rays having energies essentially in the ranges 3.17 MEV to 4.65 MEV for carbon, 4.86 MEV to 6.34 MEV for oxygen, 1.65 MEV to 1.86 MEV for silicon and 2.50 MEV to 3.30 MEV for calcium.

4. The method of claim 1 and further including the steps of making a Hydrogen Index log of the earth formations in the vicinity of the well bore and using said Hydrogen Index log to assist in the step of determining the location of coal beds.

5. The method of claim 2 and further including the step of recording as a function of borehole depth said first and second signals.

6. A method for locating and determining the quality of oil shale zones traversed by a well borehole comprising the steps of:

passing a well tool having a pulsed source of fast neutrons and a radiation detector through a well bore;

repetitively irradiating the earth formations in the vicinity of the well bore with relatively short duration bursts of fast neutrons;

detecting, during said neutron bursts, gamma rays resulting from the inelastic scattering of fast neutrons by carbon and oxygen in earth formations in the vicinity of the well bore and generating signals representative thereof;

generating a signal representative of the carbon/oxygen ratio of inelastic gamma rays in earth formations in the vicinity of the well bore;

determining the location and kerogen content of said oil shale zones by comparing said carbon/oxygen ratio signal with a predetermined relationship of said carbon/oxygen ratio signal as a function of the kerogen content of said oil shale.

7. The method of claim 6 and further including the steps of detecting gamma rays resulting from the inelastic scattering of neutrons by silicon and calcium and generating a second signal representative thereof.

8. The method of claim 7 wherein the step of detecting the inelastic gamma rays from carbon, oxygen, silicon and calcium is performed by detecting, during said neutron bursts, gamma rays having energies essentially in the ranges 3.17 MEV to 4.65 MEV for carbon, 4.86 MEV to 6.34 MEV for oxygen, 1.65 MEV to 1.86 MEV for silicon and 2.50 MEV to 3.30 MEV for calcium.

9. The method of claim 7 and further including the steps of making a Hydrogen Index log of the earth formations in the vicinity of the well bore and using said Hydrogen Index log to assist in the step of determining the location of said oil shale zones by comparing said first, second and third signals.

10. The method of claim 7 and further including the step of recording as a function of borehole depth said first and second signals.

* * * * *